United States Patent [19]

Scaramucci

[11] 4,192,484
[45] Mar. 11, 1980

[54] HIGH PRESSURE DISC VALVE

[76] Inventor: Domer Scaramucci, 3245 S. Hattie, Oklahoma City, Okla. 73129

[21] Appl. No.: 959,718

[22] Filed: Nov. 13, 1978

[51] Int. Cl.² ............................................. F16K 25/00
[52] U.S. Cl. ..................................... 251/173; 251/306
[58] Field of Search .................... 137/72, 74; 251/173, 251/306

[56] References Cited

U.S. PATENT DOCUMENTS

| 2,911,184 | 11/1954 | Moore | 251/173 |
|---|---|---|---|
| 3,734,457 | 5/1973 | Roos | 251/173 |
| 3,986,699 | 10/1976 | Wucik | 251/173 |
| 4,063,709 | 12/1977 | Lorthiois | 251/173 |
| 4,088,299 | 5/1978 | Maciulaitis | 251/173 |

Primary Examiner—Harold W. Weakley
Attorney, Agent, or Firm—Dunlap, Codding & McCarthy

[57] ABSTRACT

A disc valve includes a seat ring having a butt portion anchored to the body of the valve and a seal portion which extends axially from the butt portion. The disc of the valve is axially aligned with the seal portion of the seat ring so that the valve is sealed via engagement of the seal portion with the periphery of the disc. An annular cavity is formed about the seal portion of the seat ring and opposite ends of the cavity are vented to the valve chamber on opposite sides of the disc. An elastomeric seal disposed in the cavity is responsive to pressures of opposite ends of the cavity to close the vent to the low pressure side of the disc such that the higher of the fluid pressures on opposite sides of the disc is exerted on the outer periphery of the seal portion of the seat ring to foce the seal portion against the disc when the valve is closed.

13 Claims, 12 Drawing Figures

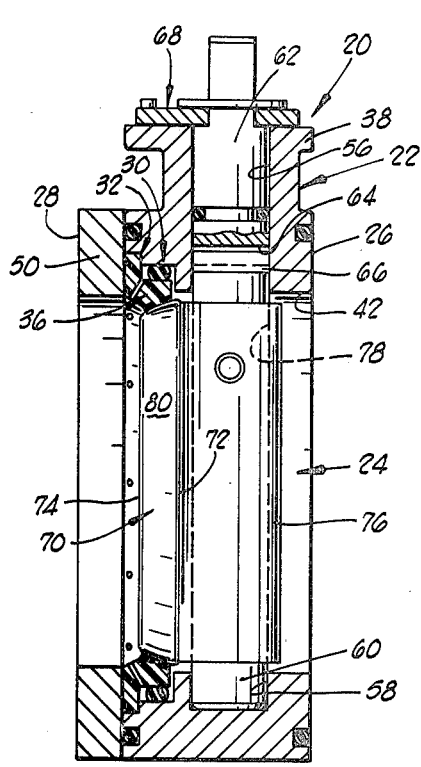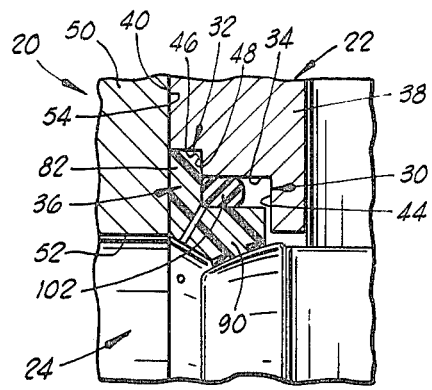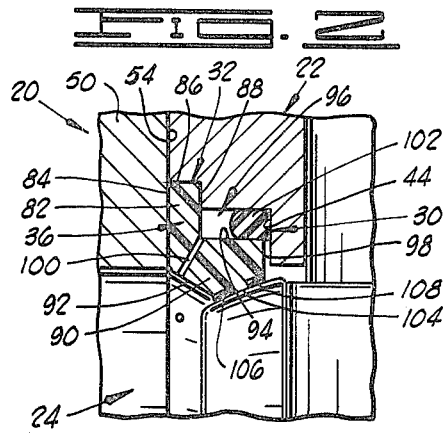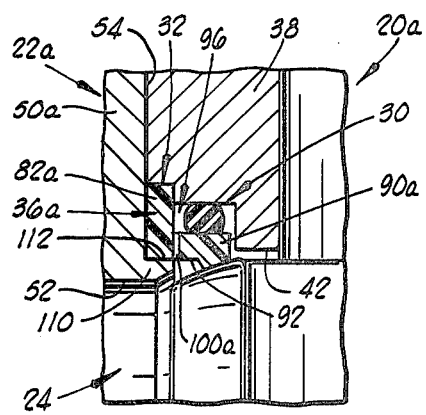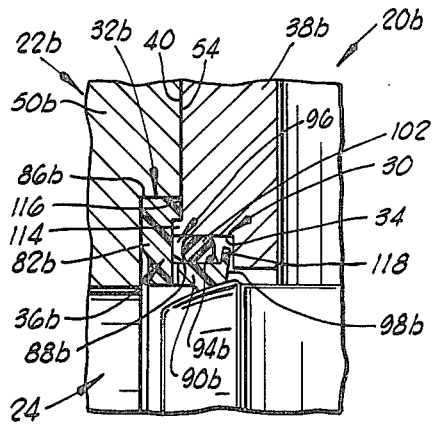

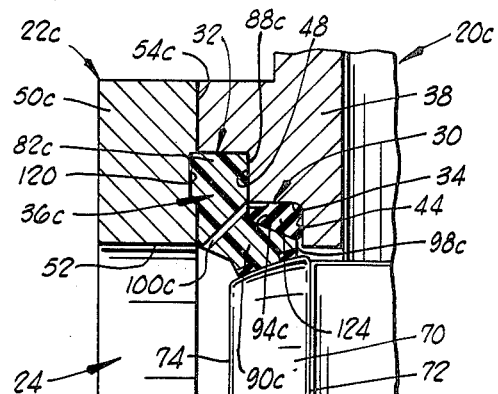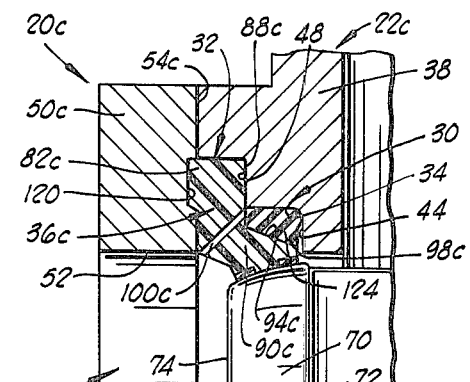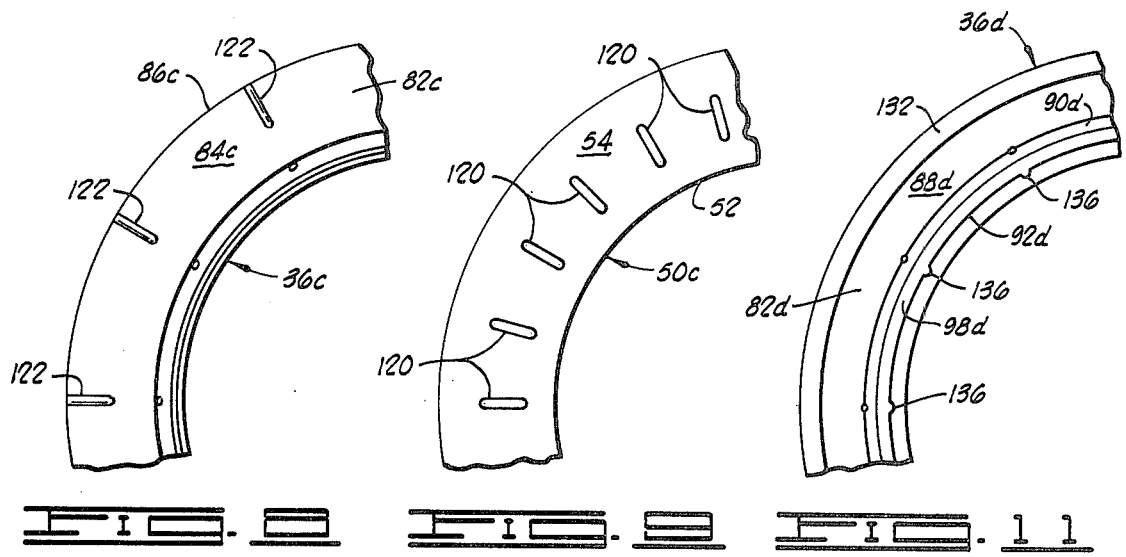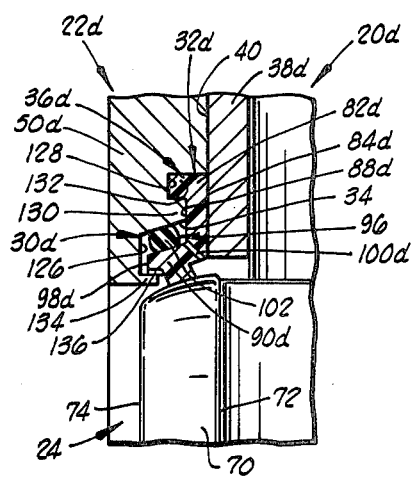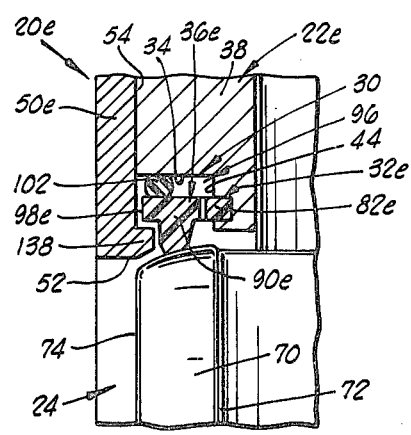

HIGH PRESSURE DISC VALVE

CROSS-REFERENCE TO RELATED APPLICATION

The present application is related to applicant's co-pending U.S. patent application entitled "Disc Valve" and filed on even date herewith.

SUMMARY OF THE INVENTION

As has been discussed in the applicant's aforementioned co-pending U.S. patent application, it is useful to construct disc valves such that a pressure differential on opposite sides of the disc is utilized to force the seat ring of the valve against the disc to affect a tight seal when the valve is closed. Moreover, it is useful to construct the valve for bi-directional sealing. That is, to construct the valve such that pressure actuation occurs without regard to the direction of flow of fluid through the valve when the valve is opened.

The use of pressure actuated sealing can result in a tendancy for the seat ring to be blown out of the pocket in which the seat ring is disposed if a large pressure differential exists across the disc. Moreover, means to prevent such blowout can result in a sacrifice of pressure actuation for the seal when a small pressure differential exists on opposite sides of the disc. As in the aforementioned co-pending application, the present invention contemplates a bi-directional disc valve having a pressure actuated seat ring comprising two portions: a relatively inflexible portion to prevent blowout; and a relatively flexible portion to permit pressure actuation for a small pressure differential on opposite sides of the disc. Specifically, the seat ring of the present invention comprises a butt portion which is anchored to the body of the valve for inflexibility of the butt portion and a seal portion which extends generally axially from the butt portion and terminates in a free end in the manner of a cantilever. A cavity is formed about the seal portion and opposite ends of the cavity are vented to the valve chamber, wherein the disc is disposed, at opposite sides of the disc. A sealing ring disposed in the cavity and extending about the seal portion of the seat ring closes the vents at the low pressure side of the cavity such that a net, radially inwardly directed force is exerted on the seal portion without regard to which side of the disc is the upstream side. The force on the seal portion of the seat ring forces the seal portion against the disc in the manner of a cantilever subjected to a transverse load such that a low pressure differential on opposite sides of the disc is sufficient to effect a tight seal of the seat ring against the disc.

An object of the present invention is to provide a bidirectional, pressure actuated disc valve which is particularly suited for high pressure service.

Another object of the present invention is to provide a pressure actuated disc valve suitable for high pressure service without sacrificing the sealing characteristics of the valve during utilization for low pressure service.

Other objects and advantages of the invention will be evident from the following detailed description when read in conjunction with the accompanying drawings which illustrate various embodiments of the invention.

BRIEF DESCRIPTION OF THE DRAWINGS

FIG. 1 is a sectional view in side elevation and partial cutaway of a disc valve constructed in accordance with the present invention.

FIG. 2 is a cross section of a portion of the valve of FIG. 1 showing the closure of the second vent to the cavity about the seal portion of the seat ring in response to upstream pressure on one side of the disc.

FIG. 3 is a cross section of a portion of the valve of FIG. 1, similar to FIG. 2, showing the closure of the first vent in response to upstream pressure at the opposite side of the disc.

FIG. 4 is a cross section of a portion of a second embodiment of the valve of the present invention showing a different manner of anchoring the seat ring.

FIG. 5 is a cross section of a portion of a third embodiment of the valve of the present invention showing yet a different manner of anchoring the seat ring.

FIG. 6 is a cross section of a portion of a fourth embodiment of the valve of the present invention showing still another manner of anchoring the seat ring and showing the closure of the first vent to the cavity about the seal portion of the seat ring.

FIG. 7 is a cross section similar to FIG. 6 showing the closure of the second vent.

FIG. 8 is a rear elevational view of a portion of the seat ring of the valve shown in FIG. 7.

FIG. 9 is an elevational view on a reduced scale of the seat retaining ring of the valve shown in FIG. 7.

FIG. 10 is a cross section of a portion of a fifth embodiment of the valve of the present invention showing another manner of anchoring the seat ring.

FIG. 11 is a front elevational view of a portion of the seat ring of the valve shown in FIG. 10.

FIG. 12 is a cross section of a portion of a sixth embodiment of the valve of the present invention showing still another manner of anchoring the seat ring.

DESCRIPTION OF FIGS. 1, 2 AND 3

Referring now to the drawings in general and to FIGS. 1, 2 and 3 in particular, shown therein and designated by the general reference numeral 20 is a disc valve constructed in accordance with the present invention. The valve 20 generally comprises a valve body 22 having a circular valve chamber 24 formed therein and extending between a first side 26 and a second side 28 of the valve body 22.

An annular groove 30 is formed in the valve body 22 near the second side 28 thereof and extends circumferentially about the valve chamber 24. An annular channel 32 is formed in the valve body 22 and the annular channel 32 intersects the outer periphery 34 of the annular groove 30 and extends circumferentially thereabout. A seat ring 36, constructed of a suitable polymeric material such as polytetrafluoroethylene, is disposed in the groove 30 and the channel 32 as will be discussed more fully below.

FIGS. 1, 2 and 3 show a convenient manner of forming the groove 30 and the channel 32 as will now be explained with particular reference to FIG. 2. (For clarity of illustration, specific features of the groove 30 and the channel 32 have not been numerically designated in FIG. 1 or FIG. 3.) The valve body 22 comprises a body member 38 extending from the first side 26 of the valve body 22 toward the second side 28 thereof and terminating near the second side 28 in an annular planar face 40. A flow passage bore 42 (see FIG. 1) is formed through the body member 38 perpendicularly to the face 40 to form a portion of the valve chamber 24. The face 40 is counterbored concentrically with the flow passage bore 42 to a preselected depth to form the outer periphery 34 and a first side wall 44 of the groove 30. The first side wall 44 of the groove 30 is substantially parallel to the face 40 such that the first side wall 44 of the groove 30 intersects the flow passage bore 42 substantially perpendicularly. The face 40 of the body member 38 is counterbored a second time to a lesser depth but greater diameter than for the above recited counterbore to form the outer periphery 46 and a first side wall 48 of the channel 32. The first side wall 48 of the channel 32 is formed substantially parallel to the first side wall 44 of the groove 30 and the outer periphery 46 of the channel 32 is formed substantially concentrically with the outer periphery 34 of the groove 30.

The valve body 22 further comprises an annular seat retaining ring 50 having a bore 52 formed therethrough on substantially the same diameter as the flow passage bore 42 (see FIG. 1) of the body member 38. The seat retaining ring 50 has an annular planar face 54, perpendicularly intersected by the bore 52, and the seat retaining ring 50 is mounted on the body member 38, via any suitable means, with the face 54 abutting the face 40 on the body member 38 and with the bore 52 disposed coaxially with the flow passage bore 42 of the body member 38. The bore 52 of the seat retaining ring 50 forms a portion of the valve chamber 24 and the face 54 on the seat retaining ring 50 forms second side walls for the groove 30 and the channel 32.

Referring once again to FIG. 1, a circular stem support bore 56 is formed through a portion of the body member 38 of the valve body 22 and extends radially from the valve chamber 24 to the exterior surface of the valve body 22. Diametrically opposed to the stem support bore 56 across the valve chamber 24, a circular recess 58 is formed in the valve body 22 coaxially with the stem support bore 56 and on a diameter substantially equal to the diameter of the stem support bore 56. A disc support shaft 60, having a diameter substantially equal to the diameters of the stem support bore 56 and the recess 58 is rotatably mounted in the valve body 22 via the stem support bore 56 and the recess 58. That is, portions of the disc support shaft 60 near the ends thereof are disposed in the stem support bore 56 and the recess 58 and the disc support shaft 60 extends across the valve chamber 24 between the stem support bore 56 and the recess 58. An operating stem 62 is rotatably mounted in the stem support bore 56 and is keyed to the disc support shaft 60 via a slot 64 formed in the end of the operating stem 62 adjacent the disc support shaft 60 and a key 66 formed on the end of the disc support shaft 60 in the stem support bore 56 such that the disc support shaft 60 can be turned by turning the operating stem 62. The operating stem 62 and, accordingly, the disc support shaft 60 are held in the valve body 22 via a suitable retaining means 68 as is known in the art and a portion of the operating stem 62 protrudes from the valve body 22 to permit turning of the operating stem 62 and disc support shaft 60 via a wrench or the like.

A valve disc 70, having a first side 72 and a second side 74, is disposed within the valve chamber 24 via mounting the disc 70 on portions of the disc support shaft 60 passing through the valve chamber 24. Specifically, a bracket 76 is formed on the first side 72 of the disc 70 and a bore 78 is formed through the bracket 76 to receive and mate with the disc support shaft 60. The bracket 76 is secured to the disc support shaft 60 via any suitable means such that the disc 70 can be turned in the valve chamber 24 via turning the operating stem 62.

The mounting of the disc 70 via the bracket 76 offsets the disc 70 from the axis of the disc support shaft 60 and the amount of offset is selected such that the disc 70 is axially aligned with the groove 30 when the disc 70 is placed in a closed position, shown in the drawings, wherein the disc 70 is positioned substantially perpendicularly to the axis of the valve chamber 24. The outer periphery 80 of the disc 70 is shaped to conform to a portion of a spherical surface centered on the intersection of the axes of the valve chamer 24 and the disc support shaft 60 to form a sealing surface which engages the seat ring 36 in the closed position of the disc 70 to close the valve 20 to fluid flow. The valve 20 is opened by turning the disc 70 to an open position (not shown) wherein the disc 70 is disposed substantially parallel to the axis of the valve chamber 24.

Referring specifically to FIG. 3, the seat ring 36 comprises a butt portion 82 having an exterior face 84 which abuts the face 54 of the seat retaining ring 50. The butt portion 82 extends radially along the face 54 of the seat retaining ring 50 from the valve chamber 24 to the outer periphery 46 of the channel 32 such that the butt portion 82 is disposed along the second side walls of the groove 30 and the channel 32. (As has been previously noted, specific features of the groove 30 and channel 32 have not been numerically designated in FIGS. 1 and 3. Similarly, specific features of the seat ring 36 have been numerically designated in FIG. 3 but, for clarity of illustration, have not been so designated in FIGS. 1 and 2.) The outer periphery 86 of the butt portion 82 of the seat ring 36 extends along the outer periphery 46 of the channel 32 and an interior face 88 of the butt portion 82 abuts and extends along the first side wall 48 of the channel 32. The seat ring 36 is constructed such that the axial width of the butt portion 82; that is, the width between the faces 84 and 88, is slightly greater than the axial width of the channel 32 prior to incorporation of the seat ring 36 into the valve 20. Thus, when the valve 20 is assembled, the butt portion 82 is compressed between the side walls of the channel 32 to anchor the butt portion 82 to the valve body 22.

The seat ring 36 further comprises a seal portion 90 which is joined to the interior face 88 of the butt portion 82 at the inner periphery 92 of the seat ring 36 and which extends from the butt portion 82 toward the first side wall 44 of the groove 30. The outer periphery 94 of the seal portion 90 is formed on a diameter which is less than the diameter of the outer periphery 34 of the groove 30 so that an annular cavity 96 is formed about the seal portion 90 of the seat ring 36. The spacing between the outer peripheries 34 and 94 of the groove 30 and seal portion 90 respectively is substantially less than the axial extent of the seat portion 90 so that the axial extent of the cavity 96 is greater than the radial extent thereof.

The seal portion 90 of the seat ring 36 terminates near the first side wall 44 of the groove 30 in a free end 98 which is spaced a short distance from the wall 44 of the groove 30 to form a first vent from one end of the cavity 96, adjacent the wall 44, to the valve chamber 24. (The spacing between the free end 98 of the seal portion 90 of the seat ring 36 and the first side wall 44 of the groove 30 has been exaggerated in the drawings.) Specifically, the first vent provides fluid communication between the cavity 96 and portions of the valve chamber 24 disposed generally on the first side 72 of the disc 70 when the disc 70 is in the closed position. A plurality of holes 100 are formed through the butt portion 82 of the seat ring 36 to form a second vent from the opposite end of the cavity 96, adjacent the butt portion 82, to the valve chamber 24. Specifically, the holes 100 provide fluid communication between the cavity 96 and portions of the valve chamber 24 disposed generally on the second side 74 of the disc 70 when the disc 70 is in the closed position.

An O-ring 102, formed of an elastomer such as rubber, is disposed in the cavity 96 about the seal portion 90 of the seat ring 36 and extends between the outer peripheries 34 and 94 of the groove 30 and the seal portion 90 of the seat ring 36 to seal one end of the cavity 96 from the other end thereof. The thickness of the O-ring 102 is substantially less than the axial extent of the cavity 96 such that the O-ring 102 is axially shiftable within the cavity 96 in response to a pressure differential at the vents; that is, in response to a pressure differential on opposite sides of the disc 70 when the disc 70 is in the closed position.

A sealing surface 104 is formed on the inner periphery 92 of the seat ring 36 near the free end 98 of the seal portion 90 of the seat ring 36. The sealing surface 104 is shaped and is positioned on the seat ring 36 such that the sealing surface 104 mates with a portion of the outer periphery 80 of the disc 70 when the disc 70 is in the closed position. A sealing ring 106, constructed of an elastomer such as rubber, is adhered to the inner periphery 92 of the seat ring 36 and extends in a circle along one side of the sealing surface 104. Similarly, a sealing ring 108 extends along the opposite side of the sealing surface 104. The sealing surface 104 and the sealing rings 106, 108 provide a seal between the seat ring 36 and the disc 70 when the valve 20 is closed.

OPERATION OF FIGS. 1, 2 AND 3

The construction of the valve 20, as has been described above, provides the valve 20 with a bi-directional, pressure-actuated sealing capability and, moreover, permits the valve 20 to be used in both high pressure and low pressure applications. When the disc 70 is disposed in the closed position shown in FIGS. 1, 2 and 3, a pressure differential between portions of the valve chamber 24 on opposite sides of the disc 70 will give rise to a pressure profile along the sealing rings 106, 108 and the sealing surface 104 and such pressure profile will increase from downstream pressure at one side of the disc 70 to upstream pressure at the other side of the disc 70. Thus, in general, an average pressure, substantially less than upstream pressure and substantially larger than downstream pressure, will be exerted on portions of the seat ring 36 engaging the disc 70. A larger average pressure will be exerted on the outer periphery 94 of the seal portion 90 of the seat ring 36 to force the seat portion 90 against the disc 70 without regard to whether a larger fluid pressure exists in portions of the valve chamber 24 on the first side of the disc 70 or whether the larger fluid pressure exists in portions of the valve chamber 24 on the second side 74 of the disc 70 as will now be explained.

The fluid pressures on opposite sides of the disc 70 are transmitted to opposite ends of the cavity 96 via the first vent provided by the spacing between the free end 98 of the seal portion 90 of the seat ring 36 and the first side wall 44 of the groove 30 and via the second vent provided by the holes 100 through the butt portion 82 of the seat ring 36. Thus, when a pressure differential exists between portions of the valve chamber 24 on opposite sides of the disc 70, the O-ring 102 is subjected to an axial force to position the O-ring 102 at one end of the cavity 96 in an overlaying relation with respect to one of the first vent or the second vent. Specifically, when the larger fluid pressure exists on portions of the valve chamber 24 adjacent the first side 72 of the disc 70, the O-ring 102 will be forced against the butt portion 82 of the seat ring 36 to overlay the second vent formed by the holes 100 as has been shown in FIG. 2. Accordingly, a seal between the cavity 96 and portions of the valve chamber 24 on the second side 74 of the disc 70 is formed substantially at the end of the cavity 96 adjacent the butt portion 82 of the seat ring 36 while the fluid pressure in portions of the valve chamber 24 on the first side 72 of the disc 70 is transmitted to the cavity 96 via the first vent. Thus, substantially the entire outer periphery 94 of the seal portion 90 of the seat ring 36 is subjected to upstream pressure on the first side 72 of the disc 70. When upstream pressure is exerted in portions of the valve chamber 24 generally on the second side 74 of the disc 70, a higher pressure will exist at the second vent formed by the holes 100 to force the O-ring 102 against the first side wall 44 of the groove 30 as has been shown in FIG. 3. Again, a seal between the cavity 96 and the downstream portion of the valve chamber 24 will be formed at the end of the cavity 96 communicating with downstream pressure such that, again, substantially the entire outer periphery 94 of the seal portion 90 of the seat ring 36 is subjected to upstream pressure. Since the average pressure on the sealing rings 106, 108 and the sealing surface 104 is substantially less than upstream pressure, and since one end of the seal portion 90 of the seat ring 36 is unsupported, the seal portion 90 of the seat ring 36 will flex in the manner of a cantilever subjected to a transverse load to force the sealing rings 106, 108 and the sealing surface 104 against the outer periphery 80 of the disc 70 to seal the valve 20. It will be noted that anchoring of the butt portion 82 of the seat ring 36 in the channel 32 permits a large pressure differential between upstream and downstream portions of the valve chamber 24 without permitting blowout of the seat ring 36 from the groove 30 and channel 32 and that cantilevering of the seal portion 90 of the seat ring 36 permits the above-described pressure actuation of the seat ring 36 when a relatively low pressure differential exists between upstream and downstream portions of the valve chamber 24.

DESCRIPTION OF FIG. 4

FIG. 4 shows a second embodiment, designated 20a, of the valve of the present invention. In particular, the seat retaining ring, designated 50a in FIG. 4, and the seat ring, designated 36a therein, differ from the seat retaining ring 50 and the seat ring 36 respectively of the valve 20 to provide a second mode of anchoring the seat ring to the valve body. Specifically, the bore 52 through the seat retaining ring 50a is formed on a diameter less than the diameter of the flow passage bore 42 formed through the body member 38 of the valve body and an annular lip 110 is formed on the face 54 of the seat retaining ring 50a adjacent the bore 52 and extending generally perpendicularly from the face 54. The lip 110 radially underlays the butt portion 82a of the seat ring 36a and the inner periphery 92 of the seat ring 36a is shaped to mate with the outer periphery 112 of the lip 110. The lip 110 supports the butt portion 82a opposite the channel 32 to anchor the butt portion 82a of the seat ring 36a to the valve body, designated 22a for the valve 20a, of the valve 20a. The second vent is formed by holes, designated 100a for the valve 20a, formed through the seal portion 90a of the seat ring 36a rather than through the butt portion 82a thereof. As in the valve 20, the axial width of the butt portion 82a of the seat ring 36a can be selected such that the butt portion 82a is placed in compression between the walls of the channel 32. The operation of the valve 20a is the same as the operation of the valve 20.

DESCRIPTION OF FIG. 5

FIG. 5 shows a third embodiment of a valve, designated 20b, constructed in accordance with the present invention. In the valve 20b, the groove 30 and the channel, designated 32b in FIG. 5, are formed by forming one counter bore in the body member 38b as in the valve 20 and forming a second counter bore in the face 54 of the seat retaining ring 50b which engages the body member 38b.

The valve 20b further illustrates a mode of anchoring the seat ring 36b to the valve body 22b to provide for high pressure service of the valve 20b. An annular lip 114 is formed on the face 40 of the body member 38b engaging the seat retaining ring 50b and the lip 114 protrudes into the channel 32b at the outer periphery 34 of the groove 30. A mating annular lip 116 is formed on the interior face 88b of the butt portion 82b of the seat ring 36b, adjacent the outer periphery 86b of the butt portion 82b, such that the lip 116 radially overlays the lip 114 formed on the body member 38b, thereby locking the seat ring 36b to the valve body 22b.

In the valve 20b, an annular retaining flange 118 is formed on the outer periphery 94b of the seal portion 90b of the seat ring 36b adjacent the free end 98b of the seal portion 90b. The retaining flange 118 prevents the O-ring 102 from being forced from the cavity 96b, around the free end 98b of the seal portion 90b, when the valve 20b is opened or closed with a large fluid pressure upstream (to the left as viewed in FIG. 5) of the valve 20b. The second vent to the cavity 96b can be formed as in the valve 20a as has been shown in FIG. 5. The operation of the valve 20b is the same as the operation of the valve 20.

DESCRIPTION OF FIGS. 6, 7, 8 AND 9

FIGS. 6 through 9 illustrate a fourth embodiment of a valve, designated 20c, constructed in accordance with the present invention. As is the case with the valve 20b, the valve 20c is particularly suited for high pressure applications. In the valve 20c, the groove 30 and the channel 32 can be formed in the same manner as in the valve 20 such that the body member 38 of the valve body 22c is substantially identical to the body member 38 of the valve body 22 of the valve 20.

In the valve 20c, a plurality of depressions 120 are formed in the face 54c of the seat retaining ring 50c which abuts the body member 38 of the valve body 22c. As is shown in FIG. 9, wherein a portion of the seat retaining ring 50c is shown on a reduced scale with respect to FIGS. 6, 7 and 8, the depressions 120 extend radially away from the bore 52 of the seat retaining ring 50c and are displaced a distance therefrom. As is more clearly shown in FIGS. 6 and 7, the displacement of the depressions 120 from the bore 52 of the retaining ring 50c radially aligns the depressions 120 with the first side wall 48 of the channel 32.

As is particularly shown in FIG. 8, the exterior face 84c of the butt portion 82c of the seat ring 36c is provided with a plurality of radially extending fins 122 extending radially inwardly from the outer periphery 86c of the butt portion 82c. The fins 122 are shaped to conform to the depressions 120 in the seat retaining ring 50c and are positioned on the seat ring 36c to mate with the depressions 120 in the assembled valve 20c. The butt portion 82c of the seat ring 36c substantially fills the channel 32c such that the radial alignment of the depressions 120 with the first side wall 44 of the groove 30 prevents axial displacement of the fins 122 from the depressions 120 in the assembled valve 20c. Accordingly, the fins 122 and depressions 120 lock the seat ring 36c to the valve body 22c.

The valve 20c further illustrates a second manner of closing one of the first vent, formed by the spacing of the free end 98c of the seal portion 90c of the seat ring 36c from the first side wall 44 of the groove 30, and the second vent, formed by holes 100c through the butt portion 82c of the seat ring 36c, in response to a pressure differential at opposite sides 72, 74 of the disc 70. The O-ring 102 disposed about the seal portion 90 of the seat ring 36 in the valve 20 is replaced, in the valve 20c, with a sealing member 124, which is constructed of a deformable elastomer such as rubber, and which is adhered via any suitable adhesive to the outer periphery 94c of the seal portion 90c of the seat ring 36c. The sealing member 124 extends axially from the butt portion 82c of the seat ring 36c to the first side wall 44 of the groove 30 and extends radially from the outer periphery 94c of the seal portion 90c of the seal ring 36c to the outer periphery 34 of the groove 30 such that the sealing member 124 substantially fills the cavity (not numerically designated in FIGS. 6 and 7) radially overlaying the seal portion 90c of the seat ring 36c.

The operation of the valve 20c differs from the operation of the valve 20 in the manner in which one of the first and second vents is closed by a pressure differential across the valve 20c as will now be explained. Referring to FIG. 6, when the fluid pressure on the second side 74 of the disc 70 exceeds the pressure on the first side 72 thereof for the closed position of the disc 70, the sealing member 124 is deformed such that portions of the sealing member 124 adjacent the free end 98c of the seal portion 90c are forced tightly against the outer periphery 94c of the seal portion 90c and against the first side wall 44 of the groove 30 to form a seal to the valve chamber 24 at substantially the entry of the first vent into the cavity overlaying the seal portion 90c while portions of the sealing member 124 adjacent the second vent (the holes 100c ) are forced away from the second vent to transmit upstream fluid pressure on the second side 74 of the disc 70 to the cavity overlaying the seal portion 90c. Such upstream pressure is transmitted via the sealing member 124 to substantially the entire outer periphery 94c of the seal portion 90c of the seat ring 36c to force the seal portion 90c against the disc 70 as in the valve 20. When the first vent is exposed to the higher pressure, the sealing member 124 is deformed to force portions thereof tightly against the butt portion 82c of the seat ring 36c and against the outer periphery 34 of the groove 30 to form a seal substantially at the entry of the second vent into the cavity about the seal portion 90c while portions of the sealing member 124 adjacent the first vent are forced away from the first vent to again transmit upstream pressure to the cavity. Again, the sealing member 124 transmits upstream pressure to substantially the entire outer periphery 94c of the seal portion 90c of the seat ring 36c to force the seal portion 90c against the disc 70.

DESCRIPTION OF FIGS. 10 AND 11

FIGS. 10 and 11 illustrate a fifth embodiment of a valve 20d constructed in accordance with the present invention. In particular, the groove, 30d in FIG. 10, and the channel, 32d in FIG. 10, in the valve body 22d are formed by successive counter bores in the seat retaining ring 50d rather than in the body member 38d of the valve body 22d. Thus, the first side walls of the groove 30d and the channel 32d are formed by the face 40 of the body member 38d engaged by the seat retaining ring 50d. Conversely, the second side walls of the groove 30d and channel 32d are formed by annular faces 126 and 128 respectively formed within the seat retaining ring 50d.

The seat ring 36d of the valve 20d is reversed in the valve body 22d with respect to the orientation of the seat ring in the valves 20, 20a, 20b and 20c. That is, the exterior face 84d of the butt portion 82d of the seat ring 36d abuts the first side walls of the groove 30d and channel 32d formed by the face 40 of the body member 38d of the valve body 22d. Thus, the first vent, formed by the spacing between the free end 98d of the seal portion 90d of the seat ring 36d and the second, rather than the first, side wall 126 of the groove 30d, communicates the cavity 96 overlaying the seal portion 90d of the seat ring 36d with portions of the valve chamber 24 on the second, rather than the first, side 74 of the disc 70. Similarly, holes 100d, forming the second vent, communicate the cavity 96 with portions of the valve chamber 24 on the first side 72 of the disc 70.

The valve 20d is constructed for relatively high pressure applications as will now be discussed. An annular lip 130 is formed on the second side wall 128 of the channel 32d adjacent the outer periphery 34 of the groove 30d and extends generally axially from the wall 128. A mating annular lip 132 is formed on the interior face 88d of the butt portion 82d of the seat ring 36d such that the lip 132 radially overlays the lip 130 to lock the seat ring 36d to the valve body 22d. In order to prevent the O-ring 102 from being blown out of the cavity 96 by exposure of the second vent, formed by the holes 100d, to excessive fluid pressure tending to force the O-ring 102 around the free end 98d of the seal portion 90d of the seat ring 36d when the valve 20d is opened or closed, an annular limiting lip 134 is formed on the first side wall 126 of the groove 30d and radially underlays the free end 98d of the seal portion 90d. As has been shown in FIG. 11, a plurality of projections 136 can be formed on the inner periphery 92d of the seat ring 36d to provide further support for the free end 98d of the seal portion 90d. The projections 136 extend a distance axially along the inner periphery 92d of the seat ring 36d from the free end 98d of the seal portion 90d to engage the annular limiting lip 134. The valve 20d operates in the same manner as the valve 20.

DESCRIPTION OF FIG. 12

FIG. 12 illustrates a sixth embodiment of a valve 20e constructed in accordance with the present invention. In the valve 20e, the channel, designated 32e, intersecting the groove 30 and accepting the butt portion 82e of the seat ring 36e is formed in the first side wall 44 of the groove 30 rather than in the outer periphery 34 thereof. The butt portion 82e of the seat ring 36e of the valve 20e mates with the channel 32e to anchor the seat ring 36e to the valve body 22e. The seal portion 90e of the seat ring 36e extends from the first side wall 44 of the groove 30 and terminates in a free end 98e near the face 54 of the seat retaining ring 50e. An annular limiting lip 138 can be formed on the face 54 of the seat retaining ring 50e for the same purpose that the limiting lip 134 is provided in the valve 20d. That is, the lip 138 radially underlays the free end 98e of the seal portion 90e of the seat ring 36e to prevent excessive pressures on opposite sides 72, 74 of the disc 70 from forcing the O-ring 102 out of the cavity 96 around the free end 98e of the seal portion 90e during opening and closing of the valve 20e. The valve 20e operates in the same manner as the valve 20.

It is clear that the present invention is well adapted to carry out the objects and obtain the ends and advantages mentioned as well as those inherent therein. While presently preferred embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. In a valve including a valve body having a valve chamber therein containing a valve disc adapted to be turned between open and closed positions, and an annular groove in the valve body surrounding the valve chamber opposite the outer periphery of the disc when the disc is in the closed position, the improvement comprising:
    a seat ring having a butt portion anchored to the valve body at one side wall of said groove and a seal portion extending generally axially from the butt portion to terminate in a free end near the opposite side wall of said groove, wherein the outer periphery of the seal portion is radially spaced from the outer periphery of said groove to form an annular cavity extending circumferentially about said seal portion, wherein the free end of said seal portion is spaced from the valve body to form a first vent between the one end of the cavity and portions of the valve chamber on one side of the disc when the disc is in the closed position, and wherein a second vent is formed in the seat ring to provide fluid communication between the opposite end of said cavity generally adjacent said butt portion and portions of the valve chamber on the opposite side of the disc; and
    elastomeric means in said annular cavity about the seal portion of seat ring for closing the first vent when the second vent is exposed to the higher of differing fluid pressures on opposite sides of the disc and for closing the second vent when the first vent is exposed to the higher fluid pressure, whereby the seal portion of the seat ring is forced against the disc when differing fluid pressures are exerted on opposite sides of the disc in the closed position of the disc.

2. The valve of claim 1 wherein an annular channel intersecting the outer periphery of the groove is formed in the valve body at one side of the groove and wherein a portion of the butt portion of the seat ring is disposed in said channel.

3. The valve of claim 2 wherein the valve body comprises:
    a body member having an annular face formed thereon to form one wall of said channel; and a seat retaining ring mounted on the body member and having an annular face formed thereon to form an opposite wall of said channel, the annular face of the seat retaining ring being disposed substantially parallel to the annular face on the body member and spaced a distance therefrom; and wherein a portion of the butt portion is compressed between the annular faces on the body member and the seat retaining ring to anchor the seat ring to the valve body.

4. The valve of claim 2 wherein an annular lip is formed on the valve body opposite the annular channel and wherein the annular lip engages a portion of the inner periphery of the seat ring, whereby the disposition of a portion of the butt portion of the seat ring in the channel co-acts with support of a portion of the inner periphery of the seat ring to anchor the seat ring in the valve body.

5. The valve of claim 2 wherein an annular lip is formed on one wall of the channel adjacent the intersection of said channel with the groove in the valve body; and wherein an annular lip is formed on the portion of the butt portion of the seat ring disposed in said channel, the annular lip on the butt portion of the seat ring radially overlaying the annular lip formed on the wall of said channel and engaging the annular lip formed on the wall of said channel to anchor the seat ring to the valve body.

6. The valve of claim 1, 2 or 5 wherein an annular flange is formed on the outer periphery of the seal portion of the seat ring adjacent the free end of said seal portion, the annular flange extending a preselected distance toward the outer periphery of the groove; wherein the width of the outer periphery of said seal portion is greater than the spacing between the outer peripheries of said seal portion and said groove; and wherein the elastomeric means comprises an O-ring disposed in the cavity and extending circumferentially about said seal portion, the O-ring engaging the outer peripheries of said seal portion and said groove to form a seal between opposite ends of said cavity, whereby the O-ring is shifted axially along said seal portion in response to differing fluid pressures of the vents to close the vent exposed to the lower fluid pressure.

7. The valve of claim 1 wherein an annular limiting lip is formed on the wall of the groove adjacent the free end of the seal portion of the seat ring and radially underlays the free end of said seal portion; and wherein a plurality of axially extending projections are formed on the inner periphery of the seat ring adjacent the free end of the seal portion thereof, the projections engaging the limiting lip for limiting radially inward displacement of the free end of the seal portion of the seat ring.

8. The valve of claim 2 or claim 5 wherein an annular limiting lip is formed on the wall of the groove adjacent the free end of the seal portion of the seat ring and radially underlays the free end of said seal portion; and wherein a plurality of axially extending projections are formed on the inner periphery of the seat ring adjacent the free end of the seal portion thereof, the projections engaging the limiting lip for limiting radially inward displacement of the free end of the seal portion of the seat ring.

9. The valve of claim 2 wherein a plurality of radially extending depressions are formed in one wall of the channel and wherein a plurality of radially extending fins mating with said depressions are formed on one side of the butt portion of the seat ring to anchor the seat ring to the valve body.

10. The valve of claim 1 or claim 9 wherein the elastomeric means comprises a deformable sealing member adhered to the outer periphery of the seal portion thereof and extending to the outer periphery of the groove to form a seal between opposite ends of the cavity about said seal portion, whereby the sealing member is deformed in response to different fluid pressures at the first and second vents to close the vent exposed to the lower fluid pressure.

11. The valve of claim 1 wherein an annular channel is formed in one wall of the groove and extends circumaxially about the valve chamber; and wherein the butt portion of the seat ring is disposed in said channel to anchor the seat ring to the valve body.

12. The valve of claim 11 wherein an annular lip is formed on the wall of the groove opposite the wall having said annular channel formed therein, the annular lip radially underlaying portions of the seat ring adjacent the free end of the seal portion of the seat ring and displaced radially inwardly therefrom to limit the radially inward displacement of the free end of the seal portion of the seat ring.

13. The valve of claim 1, 2, 3, 4, 5, 7, 11 or 12 wherein the width of the outer periphery of the seal portion of the seat ring is greater than the spacing between the outer peripheries of the groove and said seal portion; and wherein the elastomeric means comprises an O-ring disposed in the cavity formed about said seal portion, the O-ring engaging the outer peripheries of said seal portion and said groove to form a seal between opposite ends of said cavity, whereby the O-ring is shifted axially along said seal portion in response to different fluid pressures of the vents to close the vent exposed to the lower fluid pressure.

* * * * *